United States Patent
Bruck et al.

(10) Patent No.: US 10,228,674 B2
(45) Date of Patent: Mar. 12, 2019

(54) PROCESSING DEVICE AND METHOD FOR CONFIGURING AN AUTOMATION SYSTEM

(71) Applicant: SCHNEIDER ELECTRIC INDUSTRIES SAS, Rueil-Malmaison (FR)

(72) Inventors: Antoine Bruck, Rueil-Malmaison (FR); Antonio Chauvet, Rueil-Malmaison (FR); Gilles Candille, Rueil-Malmaison (FR); Jean-Marie Stawikowski, Rueil-Malmaison (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 259 days.

(21) Appl. No.: 15/022,064

(22) PCT Filed: Nov. 5, 2014

(86) PCT No.: PCT/EP2014/073782
§ 371 (c)(1),
(2) Date: Mar. 15, 2016

(87) PCT Pub. No.: WO2015/067639
PCT Pub. Date: May 14, 2015

(65) Prior Publication Data
US 2016/0224001 A1    Aug. 4, 2016

(30) Foreign Application Priority Data
Nov. 5, 2013  (EP) ..................................... 13191653

(51) Int. Cl.
*G05B 19/05*       (2006.01)

(52) U.S. Cl.
CPC ........... *G05B 19/05* (2013.01); *G05B 19/052* (2013.01); *G05B 2219/1204* (2013.01); *G05B 2219/163* (2013.01); *G05B 2219/23251* (2013.01)

(58) Field of Classification Search
CPC .................. G05B 19/05; G05B 19/052; G05B 2219/1204; G05B 2219/163; G05B 2219/23251
See application file for complete search history.

(56) References Cited

U.S. PATENT DOCUMENTS

| | | | | |
|---|---|---|---|---|
| 5,949,673 A * | 9/1999 | Struger | ................... | G05B 15/02 700/2 |
| 7,171,281 B2 * | 1/2007 | Weber | .................... | B65G 37/02 700/20 |

(Continued)

FOREIGN PATENT DOCUMENTS

| | | |
|---|---|---|
| JP | 2001-22412 A | 1/2001 |
| WO | WO 2013/007349 A1 | 1/2013 |

OTHER PUBLICATIONS

S. Campanelli et al., "Integration of IEC 61131-3 and IEC 61499 control logic using FORTE and ProConOS", 4DIAC Users' Workshop ETFA, http://www.fordiac.org/fileadmin/pdf/etfa_2012/2_Campanelli_Integration_IEC61131-3_IEC61499.pdf, (Sep. 21, 2012), 17 pages, XP055111812.

(Continued)

*Primary Examiner* — Abdelmoniem I Elamin
(74) *Attorney, Agent, or Firm* — Oblon, McClelland, Maier & Neustadt, L.L.P.

(57) ABSTRACT

A method configuring an automation system with plural controllers including first and second controllers, the method including: obtaining a first function block, having a first interface, suitable for a first application, and created by a first tool compliant with a first standard; creating a platform (Continued)

independent model for a second application with a second tool compliant with a second standard; creating a platform definition model of the first controller for the second application; creating a platform specific model for the second application, including: allocating and compiling, with the second tool, a primary part of the second application including the second function block for the first controller and a secondary part of the second application for the second controller; and downloading the first controller configuration, the first application, and the primary part of the second application to the first controller.

12 Claims, 6 Drawing Sheets

(56) References Cited

U.S. PATENT DOCUMENTS

| | | | | |
|---|---|---|---|---|
| 7,831,323 | B2 * | 11/2010 | Weber | B65G 37/02 700/20 |
| 8,229,578 | B2 * | 7/2012 | Law | G05B 19/0426 700/23 |
| 8,271,362 | B2 * | 9/2012 | Fasching | G06Q 20/40 705/30 |
| 8,381,173 | B2 * | 2/2013 | Yuan | G05B 19/056 717/104 |
| 8,903,520 | B2 * | 12/2014 | Karaffa | G05B 19/056 700/18 |
| 8,938,712 | B2 * | 1/2015 | Bostian | G06F 8/47 717/106 |
| 9,696,692 | B2 * | 7/2017 | Chouinard | G05B 11/01 |
| 9,858,044 | B2 * | 1/2018 | Chouinard | G06F 8/20 |
| 2005/0085928 | A1 * | 4/2005 | Shani | G05B 19/056 700/18 |
| 2010/0083220 | A1 | 4/2010 | Chouinard et al. | |
| 2010/0083239 | A1 * | 4/2010 | Chouinard | G06F 8/20 717/137 |
| 2010/0229151 | A1 * | 9/2010 | Yuan | G05B 19/056 717/104 |
| 2012/0174119 | A1 * | 7/2012 | Van Vechten | G06F 9/547 719/313 |
| 2013/0274901 | A1 * | 10/2013 | Chouinard | G05B 11/01 700/82 |
| 2014/0135950 | A1 * | 5/2014 | Jeschin | G05B 19/052 700/86 |
| 2014/0173557 | A1 | 6/2014 | Chouinard et al. | |
| 2016/0224002 | A1 * | 8/2016 | Weatherhead | G06F 17/30 |

OTHER PUBLICATIONS

W. Dai et al., "Redesign Distributed PLC Control Systems Using IEC 61499 Function Blocks", IEEE Transactions on Automation Science and Engineering, vol. 9, No. 2, (Apr. 1, 2012), pp. 390-401, XP055111806.

Japanese Office Action dated Jun. 15, 2018 in Japanese Patent Application No. 2018-551032 (with English translation), 6 pages.

* cited by examiner

PROCESSING DEVICE AND METHOD FOR CONFIGURING AN AUTOMATION SYSTEM

The present invention relates to a processing device for an automation system and related methods, in particular method(s) for configuring and/or operating an automation system with a plurality of controllers.

BACKGROUND

PLCs (Programmable Logic Controllers) have been used for decades for automation of electromechanical processes, such as control of machinery in factory assembly lines, amusement rides, or light fixtures. Applications controlling machine operation are typically stored in battery-backed-up or non-volatile memory of the PLC.

A programming language standard (IEC 61131-3) has been developed for programmable logic controllers dedicated to undistributed (centralized or sequential) industrial applications meaning that an application contained in one project is executed on a single platform controller (PLC).

Over the years the need for distributed systems have resulted in the development of a programming language standard (IEC 61499) dedicated to distributed (event-based) industrial applications meaning that an application contained in one project is mapped and executed on a plurality of automation controllers.

Known programming tools, such as IsaGRAF, for programmable logic controllers answers both IEC 61131-3 and IEC 61499 dedicated to centralized or distributed industrial applications. This means that the application contained in one project is to be executed either on a single PLC platform if the project is created using IEC 61131-3 or on a set of PLCs if the project is created using IEC 61499.

Functions/applications drawn up according to IEC 61131-3 can not be directly used in an IEC 61499 application, thus requiring rewriting of function blocks originally used in an IEC 61131-3 if to be used in a distributed application, which is a tedious and time consuming task.

An automation system composed of several IEC 61131-3 compatible devices is known, however requiring a supervising automata or controller to ensure consistency throughout the application. In addition, communication between controllers must be configured and programmed manually with reduced possibilities due to the sequential execution.

SUMMARY

There is a need for methods and processing devices simplifying configuration and programming of PLCs, in particular for PLCs forming part of a distributed system.

Further, it is an object to provide methods and processing devices facilitating use of function blocks for first application(s) complying with to a first standard (e.g. IEC 61131-3) in second application(s) complying with a second standard (e.g. IEC 61499).

Accordingly, a method for configuring an automation system with a plurality of controllers including a first controller and a second controller is disclosed, the method comprising obtaining a first function block or a plurality of first function blocks having a first interface, which first function block is suitable for a first application, the first function block being created by use of a first tool compliant with a first standard; creating a platform independent model (PIM) for a second application with a second tool compliant with a second standard, wherein creating the platform independent model comprises incorporating a second function block comprising the first interface and an event interface; creating a platform definition model of the first controller for the second application to form a first controller configuration; and creating a platform specific model (PSM) for the second application. Creating the platform specific model for the second application comprises one or more or all of: allocating and compiling, with the second tool, a primary part of the second application including the second function block for the first controller and a secondary part of the second application for the second controller; instantiating the first function block with the first tool; allocating, with the first tool, logical input/outputs to physical input/outputs; and compiling the first function block with the first tool into a first application. Further, the method may comprise downloading the first controller configuration, the first application and the primary part of the second application to the first controller and/or to a data carrier.

Further, a processing device for an automation system is disclosed, the processing device comprising a controller configured to execute in parallel a first application and a second application, the first application embedding a first function block having a first interface and the second application embedding a second function block comprising the first interface and an event interface.

Further, a method for operating an automation system with a plurality of controllers including a first controller and a second controller is disclosed, the method comprising executing a sequential task of a first application, the first application embedding a first function block with a first interface; and executing a distributed second application in parallel with the first application, the second application embedding a second function block comprising the first interface and an event interface.

It is an advantage of the present invention that a set of PLCs is enabled to collaborate in a distributed IEC 61499 application while each PLC is running a standalone IEC 61131-3 application. In addition, on each PLC of this system, IEC 61499 and IEC 61131-3 applications cooperate with each other.

Further, the time for programming a distributed application, e.g. by a programmer specialized in standalone IEC 61131-3 applications, is significantly reduced.

In large applications (e.g.: water treatment plant) traditionally composed of several islands of IEC 61131-3 automation controllers, it is customary to use a supervising PLC ensuring the consistency of the overall execution. With the method and device according to the invention it is possible to develop a supervisory function between these islands by implementing a distributed IEC 61499 application to be cut up and deployed on each PLC. Thus, it is no longer necessary to include in each IEC 61131-3 application/project the communication methods between controllers, since these means are implicitly deployed when mapping the second (IEC 61499) application.

The method and device simplifies and facilitates realization of distributed control between existing IEC 61131-3 systems thanks to IEC 61499. Further, existing IEC 61131-3 software can be reused in an IEC 61499 system, and existing know-how and personnel competences about IEC61131-3 can be utilized.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

The figures are schematic and simplified for clarity, and they merely show details which are essential to the understanding of the invention, while other details have been left out. Throughout, the same reference numerals are used for identical or corresponding parts.

DETAILED DESCRIPTION

The method comprises obtaining a first function block having a first interface, which first function block is suitable for a first application, the first function block being created by use of a first tool compliant with a first standard. The first tool may be part of a first framework. The second tool may be part of a second framework separate from the first framework or be integrated in the first framework. A framework is a set of softwares/tools meant to design a system in a coherent way.

The method may comprise a first compilation process for the first application or runtime and a second compilation process for the second application or runtime.

The use of two separate compilation processes allows for a more smooth migration path by preserving the original context of the first function block.

The first function block may be a program organization unit (POU) in accordance with IEC 61131-3. A POU may also be denoted a derived function block (DFB). The first function block may comprise or be composed of the first interface with one or a plurality of inputs and/or one or a plurality of outputs; one or a plurality of private internal variables and an algorithm. The algorithm may be developed with an IEC 61131-3 language, such as LADDER, FBD (Functional Block Diagram), SFC (Sequential Function Chart), ST (Structured Text), or ILS (Instruction List). The method may comprise creating the first function block with the first tool. The first function block may be stored in a database, such as a shared database accessible by all engineering tools used to program the system. The shared database may comprise or consist of a single NoSQL table in which each field is referenced by a unique identifier. Each field is thus accessible through a URI using web services, e.g. based on REST architectural style and a Data Base Explorer implementing the corresponding API (Application Programming Interface). Accordingly, obtaining a first function block having a first interface may comprise accessing a shared database e.g. using the second tool.

The method comprises incorporating and/or creating a second function block. The second function block may be an FB (IEC 61499 Function Block), such as FB1, from a generic FB capable to integrate a DFB, such as DFB1.

Using a NoSQL table allows each tool to have its own view on the table, through a Data Base Explorer, without the need to interpret the content imported. Thus, the engineering tool can easily constitute FB1 from a generic block by adding the interface defined by DFB1.input and DFB1.output and by storing the name of the instance in the IEC 61499 environment.

The method comprises creating a platform independent model (PIM) for a second application with a second tool compliant with a second standard, wherein creating the platform independent model comprises incorporating a second function block comprising the first interface and an event interface. A user may create and/or define a PIM of the distributed second application using an IEC 61499 engineering tool (second tool). The PIM may comprise or is composed of function blocks (FBs) interconnected by data and event signals. To build the PIM, the user uses types of function blocks from a library. This library may contain function blocks coming from the IEC 61499 standard library, from the FB editor built into the tool, and/or from external suppliers. The second application may be a distributed application.

The library may contain a generic function block allowing integration with IEC 61131-3 environment. This generic function block may be an IEC61499 generic function block and contains an IEC 61499 event interface in order to make the IEC 61131-3 DFBs or POUs (first function blocks) usable in a IEC 61499 application. The event interface can be modified as needed via an editor integrated into the tool.

The method comprises creating a platform definition model (PDM) of the first controller for the second application. Creating a PDM may comprise defining respective PLC configurations for at least the first and second PLCs using the same engineering tool (first tool) used to create the DFBs (Unity). Thus for each control platform, the user configures the physical elements that compose it (PS, CPU, 10 modules) using the dedicated configuration editor. Creating a PDM may comprise defining or describing the connections (Ethernet network) between the different PLCs (machines) using the second tool (IEC 61499).

The method comprises creating a platform specific model (PSM) for the second application. Creating the PSM for the second application may comprise allocating and compiling, with the second tool, a primary part of the second application including the second function block for the first controller and a secondary part of the second application for the second controller. Allocating parts of the second application may comprise allocating different parts of the second (distributed) application onto the previously configured PLCs. Service Interface Function Blocks (SIFBs) implementing the communication between the different parts of the second application may then be inserted, e.g. automatically inserted, by the second tool. Creating the PSM for the second application may comprise downloading each part of the second application in the corresponding PLCs.

Creating the PSM for the second application comprises instantiating the first function block with the first tool. For example, the user may use the first tool (IEC61131-3, e.g. Unity Pro) to instantiate the DFB coming from the previous allocation in a "section" of a task dedicated to the distributed portion of the system (DIST). This task has the particularity of not being managed by the sequential runtime environment of the PLC which includes MAST and FAST tasks. For example, DFB1 may be instantiated in a section with the name "DFB1 Instance" and its inputs/outputs may be associated to input/outputs of the second function block. The method may comprise programming MAST and FAST tasks which will execute in parallel of the distributed second application.

The method comprises downloading the first controller configuration, the first application and the primary part of the second application to the first controller. For example, the user may download the first application including DFBs instantiated for the needs of the distributed second application.

The first application may be sequential and/or the second application may be event-driven. The first application may be compliant with a first standard, such as IEC standard 61131-3 and/or the second application may be compliant with a second standard, such as IEC standard 61499.

Creating the platform independent model may comprise accessing a shared database comprising an agnostic presentation of the first function block with the second tool.

In the method for operating an automation system, executing a sequential task of a first application may comprise executing sequential tasks MAST & FAST.

Executing a distributed second application in parallel with the first application may comprise executing the distributed second application according to the event sequence composed by the function-block network; either they are on the same PLC or not. When a second function block (e.g. IEC 61499 function-block) uses a DFB imported from the shared database, the execution of the second function block then implies calling code that was downloaded with the first application during configuration. This execution also implies writing and reading DFB variables still through the first, e.g. IEC 61131-3, runtime environment.

Executing the second function block may comprise executing an algorithm of the first function block. Executing the second function block may comprise writing and/or reading a variable of the first function block. The body of a second function block of the second application may be executed in the first part (IEC 61131-3), thus accessing the internal variables and/or physical inputs/outputs of the PLC.

Figure 1:
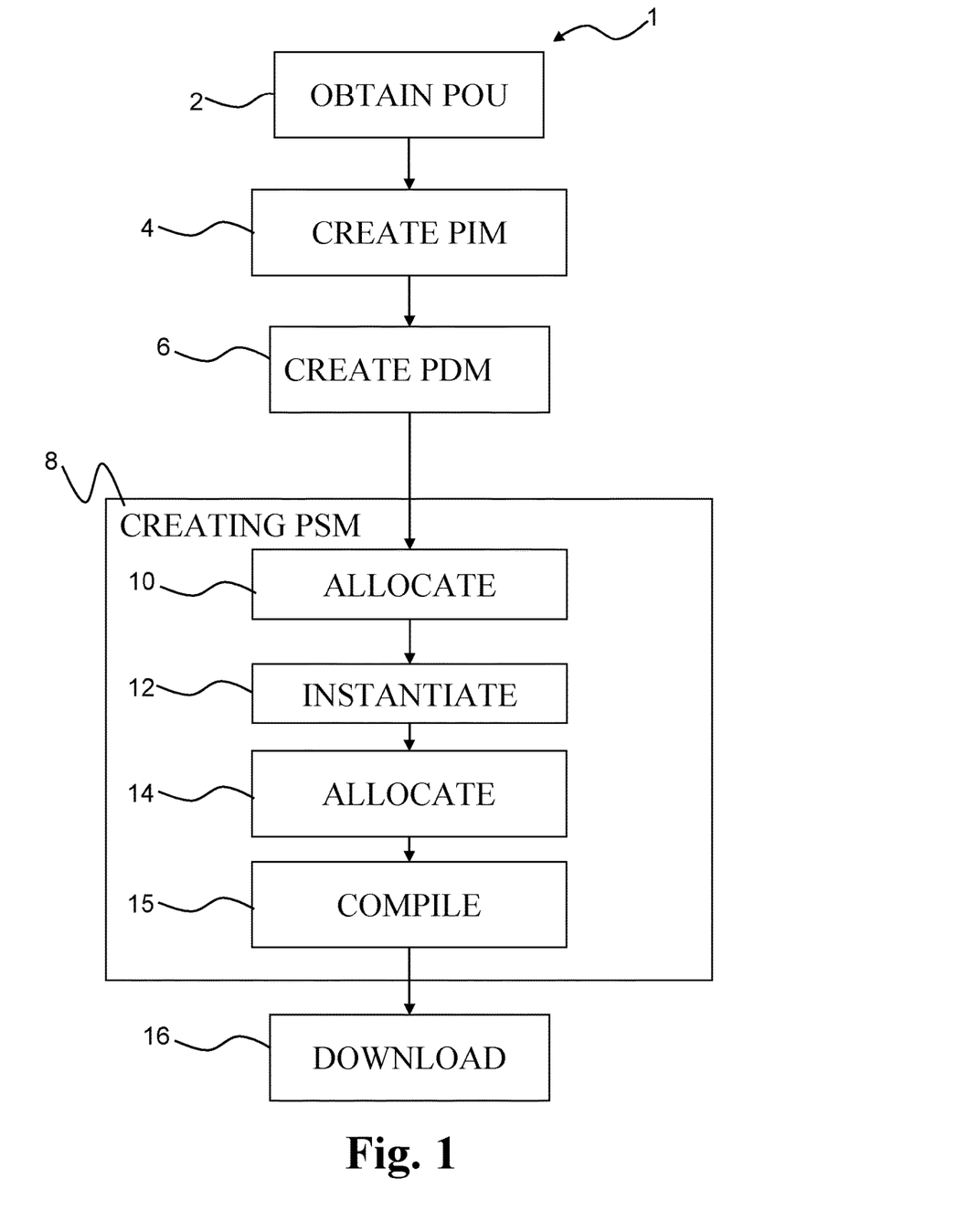
FIG. 1 is a flow diagram of an exemplary method for configuring an automation system.
Figure 2:
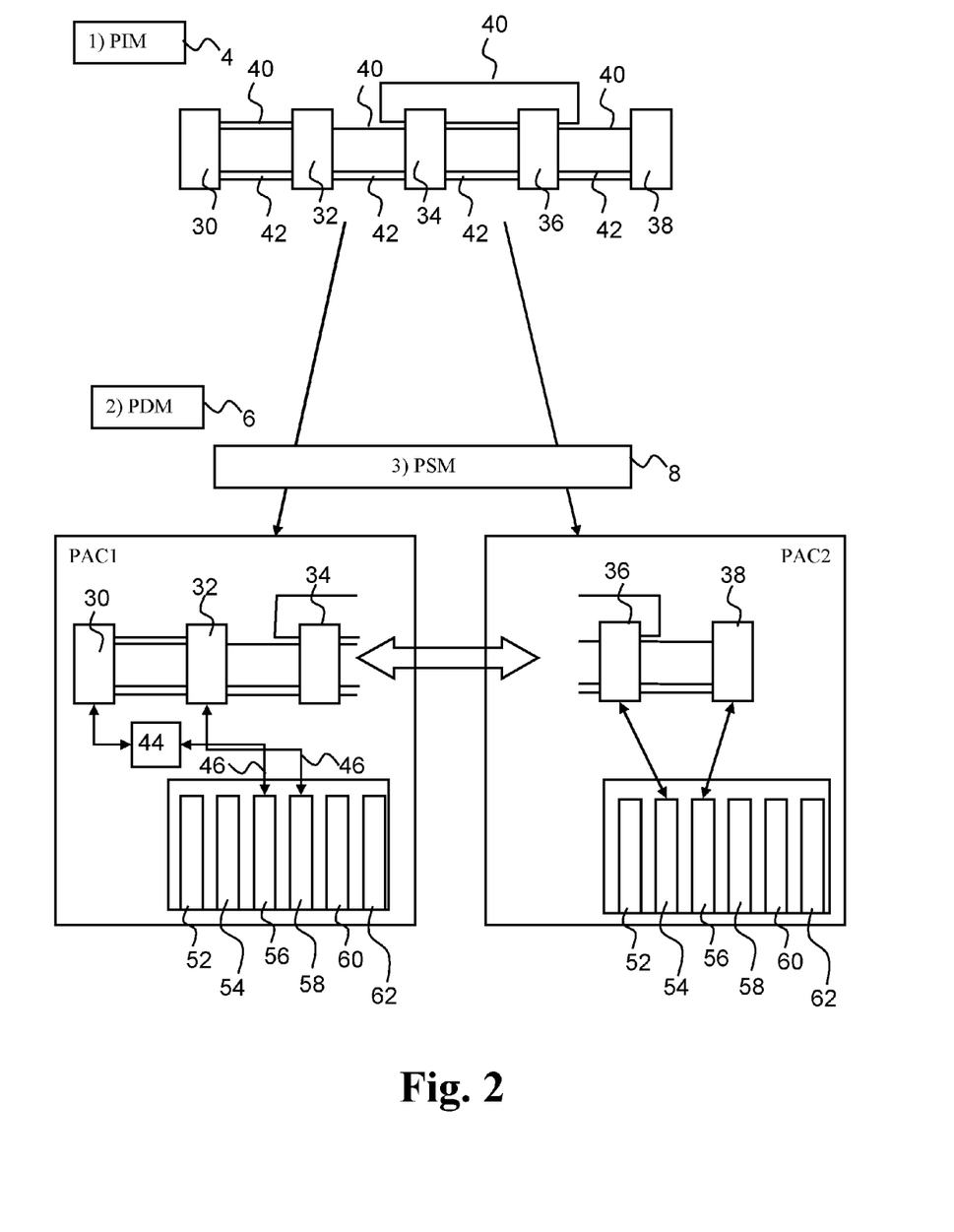
FIG. 2 illustrates an approach with the method of the present invention.

FIG. 1 is an exemplary flow diagram of a method for configuring an automation system. The method 1 comprises obtaining 2 a first function block having a first interface, which first function block is suitable for a sequential first application, the first function block being created by use of a first tool compliant with a first standard (IEC 61131-3). The first function block comprises one or a plurality of private variables and an algorithm. The method proceeds to creating 4 a platform independent model (PIM) for an event-driven second application with a second tool compliant with a second standard (IEC 61499), wherein creating the platform independent model comprises incorporating a second function block comprising the first interface and an event interface. Creating 4 the platform independent model comprises accessing a shared database comprising an agnostic presentation of the first function block with the second tool. Upon creation 4 of the PIM, the method moves to creating 6 a platform definition model (PDM) of the first controller for the second application to form a first controller configuration, and then proceeding to creating 8 a platform specific model (PSM) for the second application. Creating 8 the PSM for the second application comprises: allocating and/or compiling 10, with the second tool, a primary part of the second application including the second function block for the first controller and a secondary part of the second application for the second controller; instantiating 12 the first function block with the first tool; and allocating 14, with the first tool, logical input/outputs to physical input/outputs. The method proceeds to compiling 15 the first function block with the first tool into a first application, and the method comprises downloading 16 the first controller configuration, the first application and the primary part of the second application to the first controller. The step of compiling, with the second tool, a primary part of the second application including the second function block for the first controller and a secondary part of the second application for the second controller may be executed in compiling 15;

FIG. 2 illustrates an approach with the method of the present invention on a first controller and a second controller. A platform independent model (PIM) is created 4 for an event-driven second application, the PIM incorporating one or more second function blocks 30, 32, 34, 36, 38 with event input/outputs on event lines 40 and data input/outputs on data lines 42. Creating 4 the platform independent model comprises accessing a shared database comprising an agnostic presentation of the first function block 44 with the second editor thereby obtaining the first function block. Upon creation of the PIM, a platform definition model (PDM) of the first controller PAC1 for the second application is created. Then a platform specific model (PSM) is created 8 for the second application. Creating 8 the PSM for the second application comprises: allocating and compiling, with the second tool, a primary part 30, 32, 34 of the second application including the second function block for the first controller PAC1 and a secondary part 36, 38 of the second application for the second controller PAC2. The first function block 44 is instantiated with the first tool; and logical input/outputs are allocated 46 with the first tool to physical input/outputs of I/O modules 56, 58 of PAC1. The first function block is compiled into a first application with the first tool. The method comprises downloading the first controller configuration, the first application and the primary part 30, 32, 34 of the second application to the first controller PAC1. The method optionally comprises downloading the second controller configuration and the secondary part 36, 38 of the second application to the second controller PAC2.

Figure 3:
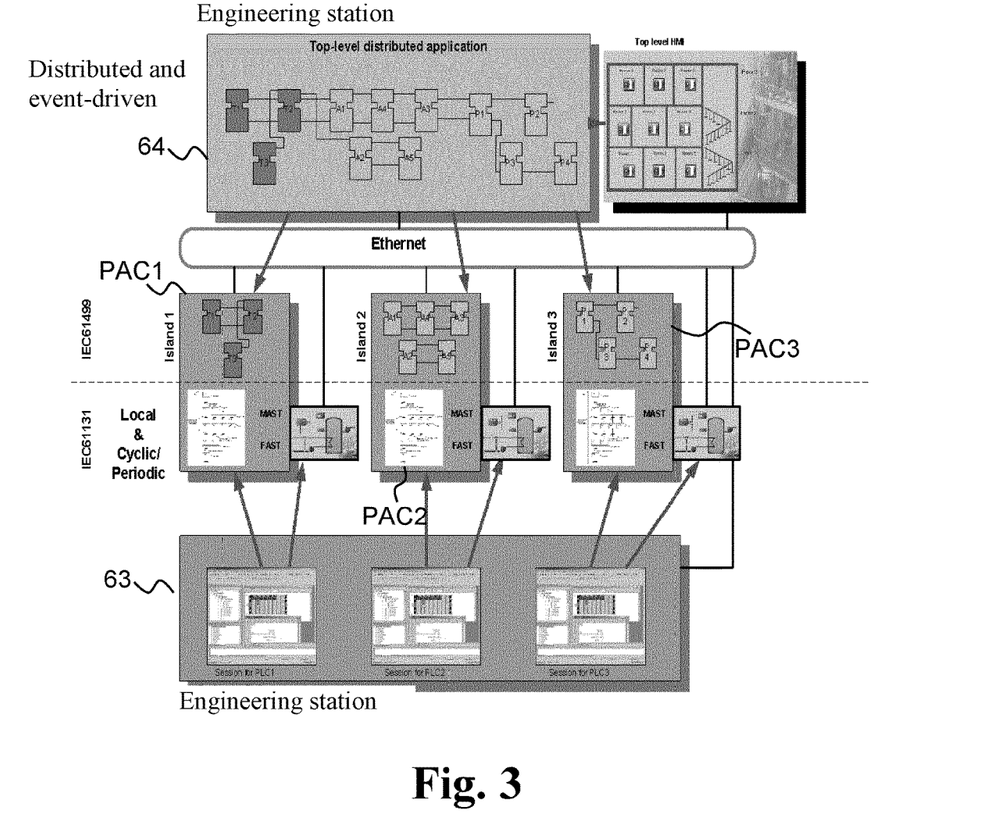
FIG. 3 illustrates an exemplary hybrid application architecture.

FIG. 3 illustrates exemplary hybrid application architecture including a plurality of controllers PAC1, PAC2 and PAC3 configured by use of a first tool 63 and a second tool 64 optionally implemented in separate first and second frameworks or in a common framework.

Figure 4:
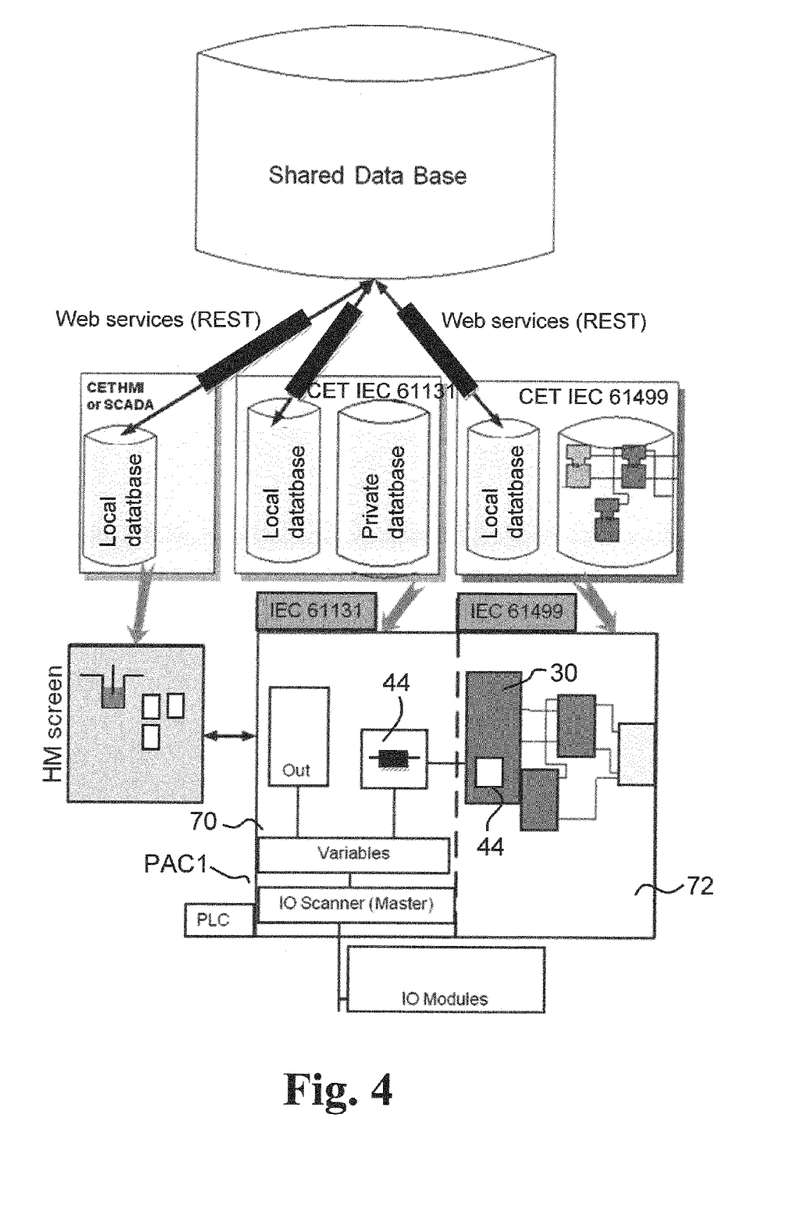
FIG. 4 illustrates interactions between the first and second standards.

FIG. 4 illustrates interactions between the first and second standards. A controller PAC1 is configured to execute a first runtime environment (first standard) 70 and a second runtime environment (second standard) 72.

Figure 5:
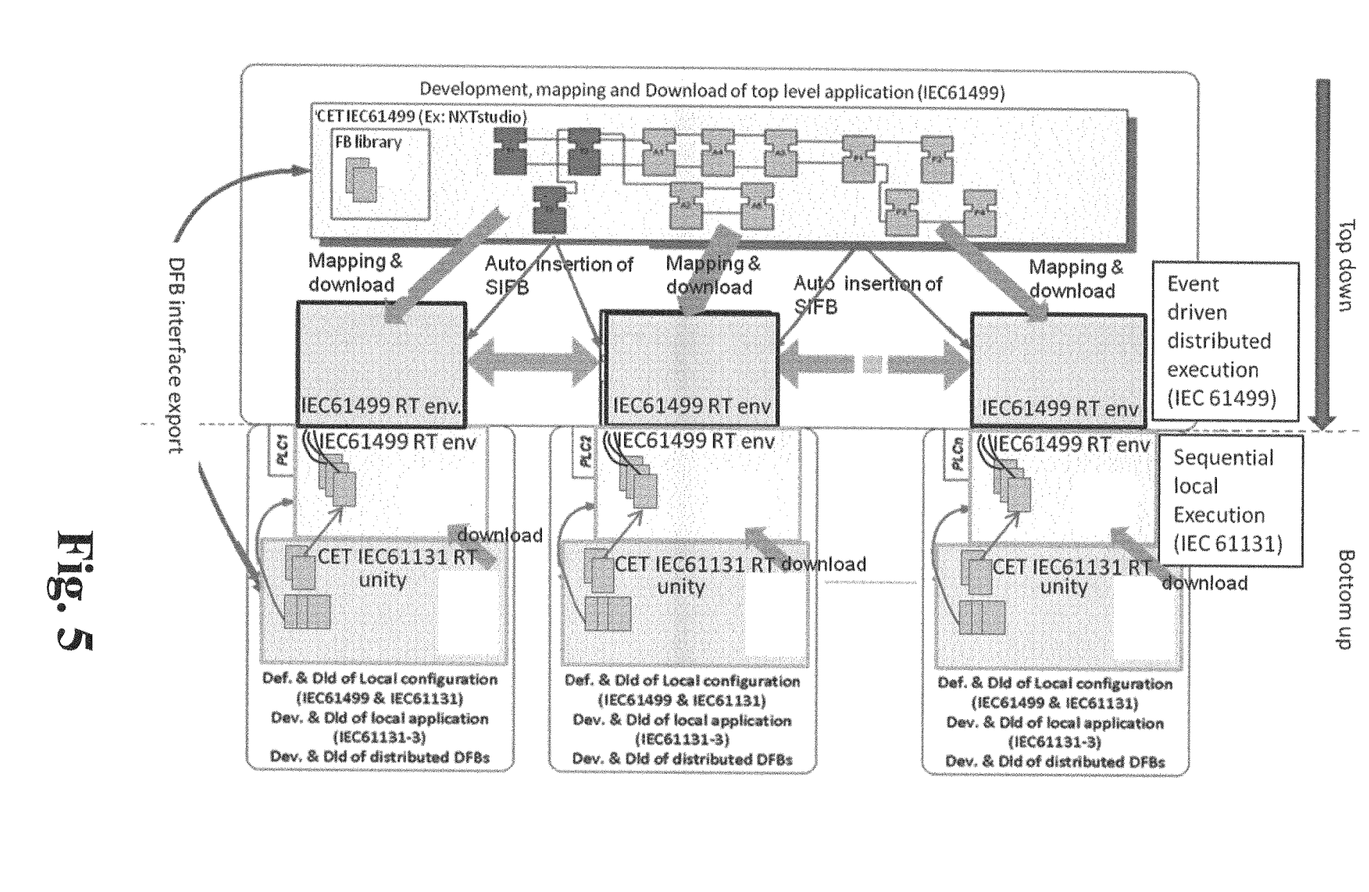
FIG. 5 illustrates a global functional view.

FIG. 5 illustrates a global functional view of the method and device.

Figure 6:
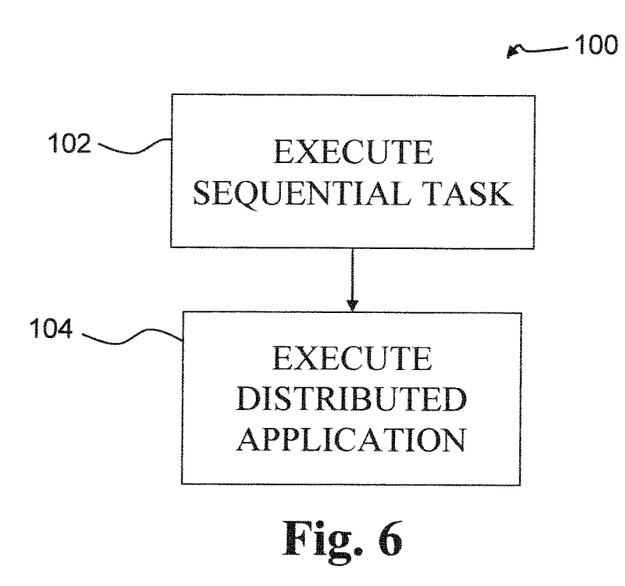
FIG. 6 is a flow diagram of an exemplary method for operating an automation system.

FIG. 6 is an exemplary flow diagram of a method for operating an automation system. The method 100 comprises executing 102 a sequential task of a first application, the first application embedding a first function block with a first interface and executing 104 a distributed second application in parallel with the first application, the second application embedding a second function block comprising the first interface and an event interface. Executing the second function block comprises executing an algorithm of the first function block. Further, executing the second function block comprises writing and/or reading a variable of the first function block.

Exemplary method(s) and processing device(s) are disclosed according to any of the following items.

Item 1. Method for configuring an automation system with a plurality of controllers including a first controller and a second controller, the method comprising obtaining a first function block having a first interface, which first function block is suitable for a first application, the first function block being created by use of a first tool compliant with a first standard;

creating a platform independent model for a second application with a second tool compliant with a second standard, wherein creating the platform independent model comprises incorporating a second function block comprising the first interface and an event interface;

creating a platform definition model of the first controller for the second application to form a first controller configuration;

creating a platform specific model for the second application, wherein creating the platform specific model for the second application comprises:

allocating and compiling, with the second tool, a primary part of the second application including the second function block for the first controller and a secondary part of the second application for the second controller;

instantiating the first function block with the first tool;

allocating, with the first tool, logical input/outputs to physical input/outputs; and compiling the first function block with the first tool into a first application; and the method comprising downloading the first controller configuration, the first application and the primary part of the second application to the first controller.

Item 2. Method according to item 1, wherein the first application is sequential and the second application is event-driven.

Item 3. Method according to any of items 1-2, wherein the first application is compliant with a first standard, such as IEC standard 61131-3.

Item 4. Method according to any of items 1-3, wherein the second application is compliant with a second standard, such as IEC standard 61499.

Item 5. Method according to any of items 1-4, wherein the first function block comprises one or a plurality of private variables and an algorithm.

Item 6. Method according to any of items 1-5, wherein creating the platform independent model comprises accessing a shared database comprising an agnostic presentation of the first function block with the second tool.

Item 7. A processing device for an automation system, the processing device comprising a controller configured to execute in parallel a first application and a second application, the first application embedding a first function block having a first interface and the second application embedding a second function block comprising the first interface and an event interface.

Item 8. A processing device according to item 7, wherein the first application is sequential and the second application is event-driven.

Item 9. A processing device according to any of items 7-8, wherein the first application is compliant with a first standard, such as IEC standard 61131-3.

Item 10. A processing device according to any of items 7-9, wherein the second application is compliant with a second standard, such as IEC standard 61499.

Item 11. A processing device according to any of items 7-10, wherein the first function block comprises one or a plurality of private variables and an algorithm.

Item 12. A method for operating an automation system with a plurality of controllers including a first controller and a second controller, the method comprising executing a sequential task of a first application, the first application embedding a first function block with a first interface; and executing a distributed second application in parallel with the first application, the second application embedding a second function block comprising the first interface and an event interface.

Item 13. A method according to item 12, wherein executing the second function block comprises executing an algorithm of the first function block.

Item 14. A method according to any of items 12-13, wherein executing the second function block comprises writing and/or reading a variable of the first function block.

LIST OF REFERENCES

1 Method for configuration
2 Obtaining
4 Creating PIM
6 Creating PDM
8 Creating PSM
10 Allocating
12 Instantiating
14 Allocating
15 Compiling
16 Downloading
30 second function block
32 second function block
34 second function block
36 second function block
38 second function block
40 event line
42 data line
44 first function block
50 processor, CPU
52 power supply
54 communication module
57 processor, CPU
58 Input/Output module and/or option module (serial link etc)
60 Input/Output module and/or option module (serial link etc)
62 Input/Output module and/or option module (serial link etc)
63 first tool
64 second tool
70 first runtime environment
72 second runtime environment
PAC1 first controller
PAC2 second controller
PAC3 third controller
100 Method for operating
102 Execute sequential task
104 Execute distributed application

The invention claimed is:

1. A method for configuring an automation system with a plurality of controllers including a first controller and a second controller, the method comprising:

obtaining a first function block including a first interface, which first function block is configured for a sequential first application compliant with a first standard, the first function block being created by use of a first tool compliant with the first standard;

creating a platform independent model for an event-driven second application compliant with a second standard with a second tool compliant with the second standard, wherein creating the platform independent model comprises incorporating a second function block comprising the first interface and an event interface;

creating a platform definition model of the first controller for the second application to form a first controller configuration;

creating a platform specific model for the second application, wherein creating the platform specific model for the second application comprises:
  allocating and compiling, with the second tool, a primary part of the second application including the second function block for the first controller and a secondary part of the second application for the second controller;
  instantiating the first function block with the first tool;
  allocating, with the first tool, logical input/outputs to physical input/outputs; and
  compiling the first function block with the first tool into a first application; and
downloading the first controller configuration, the first application, and the primary part of the second application to the first controller.

2. The method according to claim 1, wherein the first standard is IEC standard 61131-3.

3. The method according to claim 1, wherein the second standard is IEC standard 61499.

4. The method according to claim 1, wherein the first function block comprises one or a plurality of private variables and an algorithm.

5. The method according to claim 1, wherein creating the platform independent model comprises accessing a shared database comprising an agnostic presentation of the first function block with the second tool.

6. A processing device for an automation system, the automation system being configured by
  obtaining a first function block including a first interface, which first function block is configured for a sequential first application compliant with a first standard, the first function block being created by use of a first tool compliant with the first standard; creating a platform independent model for an event-driven second application compliant with a second standard with a second tool compliant with the second standard, wherein creating the platform independent model comprises incorporating a second function block comprising the first interface and an event interface;
  creating a platform definition model of a first controller for the second application to form a first controller configuration;
  creating a platform specific model for the second application, wherein creating the platform specific model for the second application comprises:
  allocating and compiling, with the second tool, a primary part of the second application including the second function block for the first controller and a secondary part of the second application for a second controller;
  instantiating the first function block with the first tool;
  allocating, with the first tool, logical input/outputs to physical input/outputs; and
  compiling the first function block with the first tool into a first application; and
downloading the first controller configuration, the first application, and the primary part of the second application to the first controller, the processing device comprising:
the first controller or the second controller configured to execute in parallel the sequential first application compliant with the first standard, and the event-driven second application compliant with the second standard, the first application embedding the first function block having the first interface and the second application embedding the second function block comprising the first interface and the event interface.

7. The processing device according to claim 6, wherein the first standard is IEC standard 61131-3.

8. The processing device according to claim 6, wherein the second standard is IEC standard 61499.

9. The processing device according to claim 6, wherein the first function block comprises one or a plurality of private variables and an algorithm.

10. A method for operating an automation system with a plurality of controllers including a first controller and a second controller, the automation system being configured by
  obtaining a first function block including a first interface, which first function block is configured for a sequential first application compliant with a first standard, the first function block being created by use of a first tool compliant with the first standard; creating a platform independent model for an event-driven second application compliant with a second standard with a second tool compliant with the second standard, wherein creating the platform independent model comprises incorporating a second function block comprising the first interface and an event interface;
  creating a platform definition model of the first controller for the second application to form a first controller configuration;
  creating a platform specific model for the second application, wherein creating the platform specific model for the second application comprises:
  allocating and compiling, with the second tool, a primary part of the second application including the second function block for the first controller and a secondary part of the second application for the second controller;
  instantiating the first function block with the first tool;
  allocating, with the first tool, logical input/outputs to physical input/outputs; and
  compiling the first function block with the first tool into a first application; and
  downloading the first controller configuration, the first application, and the primary part of the second application to the first controller. the method comprising:
  executing a sequential task of the first application, the first application embedding the first function block with the first interface; and
  executing the second application in parallel with the first application, the second application embedding the second function block comprising the first interface and the event interface.

11. The method according to claim 10, wherein executing the second function block comprises executing an algorithm of the first function block.

12. The method according to claim 10, wherein executing the second function block comprises writing and/or reading a variable of the first function block.

* * * * *